455-608 AU 233 EX

FIP3106 OR 3,407,301

EXAMINER

Oct. 22, 1968 E. F. KOVANIC 3,407,301

ELECTRO-OPTICAL DATA PROCESSING SYSTEM

Filed Dec. 16, 1964

INVENTOR
E. F. KOVANIC
BY Roy M. Porter Jr.
ATTORNEY 3,407,301
ELECTRO-OPTICAL DATA PROCESSING SYSTEM
Edward F. Kovanic, Caldwell, N.J., assignor to Bell Telephone Laboratories, Incorporated, New York, N.Y., a corporation of New York
Filed Dec. 16, 1964, Ser. No. 418,643
4 Claims. (Cl. 250—199)

ABSTRACT OF THE DISCLOSURE

A digital communication system wherein both coding and decoding are accomplished by optical means. In the coder the electrical analog signal is converted into an intensity modulated light signal and is transmitted to a plurality of light sensitive threshold devices through a quantizing mask. The mask attenuates the light striking different threshold devices by different amounts such that as the amplitude of the input increases the devices are turned ON in succession. Logic circuitry is employed to convert the information from the light-triggered device to a binary code. In the decoder each of a plurality of light sources is turned ON or OFF by a selected one of the bits in the incoming code. The light sources then irradiate a single detector through an attenuating medium which diminishes the light intensity from each source in an inverse relation to the significance of its associated input bit.

This invention relates to an electro-optical system for translating between analog signal amplitudes and their representative digital code words.

The use of optical rather than electrical phenomena in communication and data handling systems has recently become the subject of increased interest. The superior properties of light for the transmission of information may be exploited to great advantage. Both the loss and the propagation time of optical transmission paths are extremely small. In addition, interaction or "crosstalk" between channels is negligible in an optical system. Accordingly, the density of these channels may be greatly increased to permit the use of integrated circuit techniques thereby serving the needs of improved performance and economical manufacture.

It is a principal object of the present invention to provide means for translating between digitally modulated and analog modulated light signals.

It is a related object of the invention to code and decode electrical signals by optical means.

The present invention takes the form of a digital communication system wherein both the coding and decoding are accomplished by optical rather than electrical devices. According to one aspect of the present invention, the coding of an electrical information bearing signal may be accomplished by converting this signal into an intensity modulated light which is transmitted to a plurality of light sensitive threshold devices through a "quantizing mask." The mask attenuates the light striking different threshold devices by different amounts such that, as the amplitude of the input signal increases, the devices are turned ON in succession. Logic circuitry is employed to convert the information from the light-triggered devices into conventional binary code words.

The decoder contemplated by this aspect of the invention comprises a plurality of light sources each turned ON by a selected one of the digits in the incoming code word. All of these digit-responsive sources irradiate a single detector which delivers an output signal having a magnitude proportional to the total received light. An attenuating medium is employed to diminish the light intensity from each source in inverse relation to the significance of the associated input digit.

According to a further aspect of the invention, signal translations may be accomplished between digitally modulated and analog modulated light signals.

Figure 1:
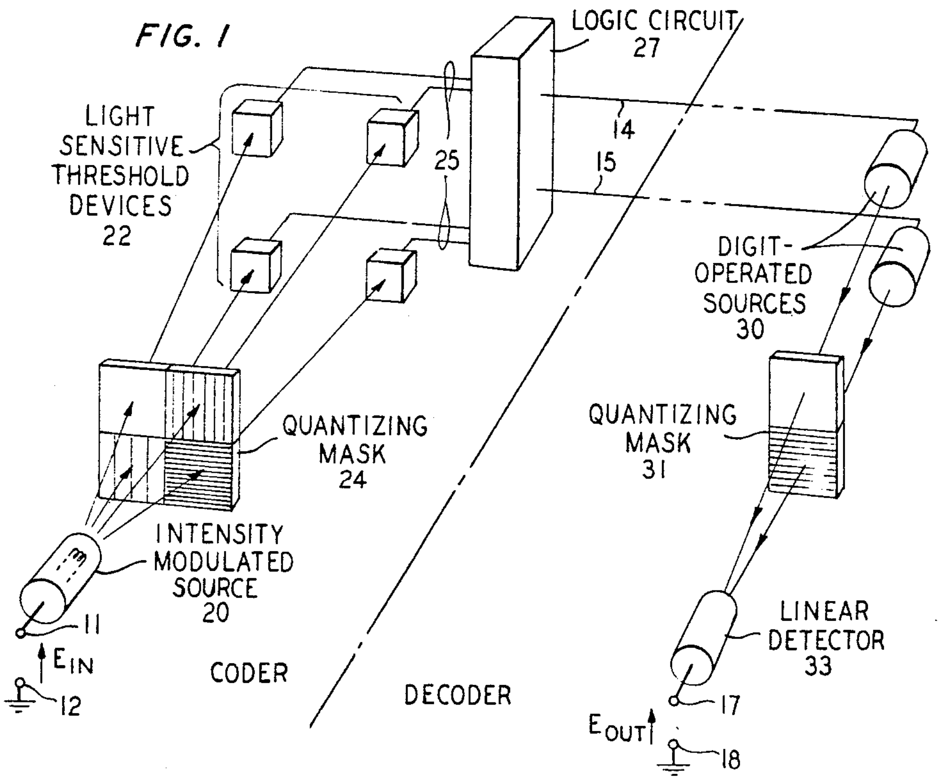
Figure 2:
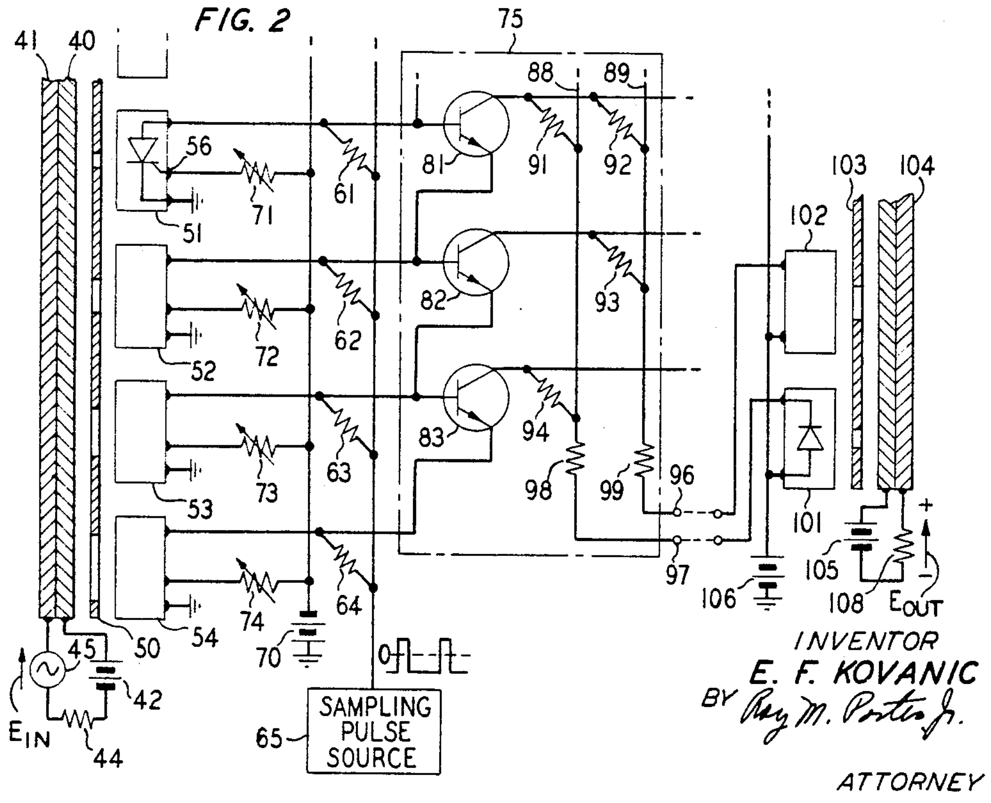

These and other objects, features and advantages of the present invention may be more clearly understood by considering the following detailed description of a preferred embodiment of the invention. In the written text of this description, reference will be made to the attached drawings in which:

FIG. 1 is a perspective view of a simplified embodiment of the invention shown for the purpose of illustration; and, FIG. 2 is a detailed schematic drawing of a digital communication system employing the principles of the present invention.

FIG. 1 shows a complete digital communication system comprising at the transmitting end a coder and a decoder at the receiving end of the system. The illustrative arrangement shown in FIG. 1 converts an information bearing electrical analog signal applied across terminals 11 and 12 into an electrical digital signal which is transmitted to the decoder by means of digit conductors 14 and 15. The decoder section of the system converts the received digital signal into a replica of the original electrical analog signal which then appears across terminals 17 and 18.

As will be explained, the translations between digital and analog signals are performed by electro-optical devices.

The input signal applied across terminals 11 and 12 is first converted by input transducer 20 into intensity modulated light, the luminosity of the light from transducer 20 being proportional to the amplitude of the electrical input signal. This light signal is directed to a group of light-sensitive threshold devices 22 through a "quantizing mask" 24. Mask 24 is divided into sections, each section being directly in the path between one of the threshold devices 22 and the source 20. The threshold devices act as transducers to convert the optical signals back into electrical signals. Each of the devices 22 is turned ON whenever the intensity of the received light is greater than a predetermined threshold value and remains in an OFF condition whenever the incident light intensity is less than this threshold.

In the arrangement shown in FIG. 1, the thresholds for all of the detectors are substantially identical. Because each of the sections of the mask 24 attenuates the light to a different degree, however, only those detectors receiving attenuated intensities greater than the above-mentioned threshold level are turned ON. The amounts of attenuation contributed by the various sections of the mask are arranged such that all of the detectors are triggered ON when a full amplitude input signal is applied to source 20 while none are triggered when a zero amplitude input is applied. As may be appreciated, as the input signal amplitude increases, the threshold devices are turned ON in succession.

In the coder shown in FIG. 1, if $n$ threshold devices are employed to provide $n$ decision levels, the input signal range is divided $(n+1)$ quantizing ranges (counting the range above the upper decision level and the range below the lowest decision level). These threshold devices accordingly deliver an $n$-digit binary code on the output conductors 25. This code is highly redundant, however, since all of the information obtainable from the threshold devices is carried by a single one of the conductors 25. For instance, if that threshold device which receives the most attenuated light is turned ON, it is certain (absent a malfunction) that all of the others will be turned ON as well. The logic circuit 27 is accordingly employed to convert the redundant code carried by conductors 25 into a more efficient form (such as conventional binary, Gray code, bipolar, etc.) for transmission over the path represented by conductors 14 and 15.

At the receiving end of the system in FIG. 1, an electro-optical decoder is shown which comprises a set of digit-operated light sources 30, a quantizing mask 31, and a detector 33. Whenever the digit applied to one of the sources 30 is a "1," that source is turned ON to radiate light towards the detector 33. The light from each of these sources 30 is attenuated by the mask 31 in accordance with the significance of the associated digit. Thus, as shown in FIG. 1, the upper source 30 (which receives the more significant digit) delivers more light to the detector 33 than does the lower source 30. The detector 33 is adapted to deliver an electrical output signal to the terminals 17 and 18 which has an amplitude directly related to the total light received by the detector 33. The decoding arrangement thus delivers a replica of the original input signal. Although the system shown in FIG. 1 handles only two binary digits, it will be obvious to those skilled in the art that the basic scheme may be extended to any number of digits.

In the system shown in FIG. 1 of the drawings, the transmission of information from the transmitting to the receiving end of the system is done with electrical digital signals over the path represented by conductors 14 and 15. As is well known in the art, message signals may also be transmitted over long paths by the light beams themselves. In the system of FIG. 1, for example, the light paths connecting the digit operated source 30 and the quantizing mask 31 may be used as the actual long distance path of the system.

In addition, signal translation, in accordance with the present invention, may be accomplished between digitally modulated and analog modulated light signals. This may be appreciated when it is noted that the input to mask 24 is an analog modulated light signal while the output from the sources 30 is digitally modulated light. Similarly, the mask 31 performs the conversion from a digital light signal from the source 30 into the analog modulated light signal which irradiates detector 33. Thus, the principles of the invention may be applied to provide apparatus for translating an already available light signal of either the digital or the analog form into an electrical or optical signal of another form.

FIG. 2 of the drawings schematically illustrates in more detail the digital translation system as contemplated by the present invention which employs the same basic coding and decoding techniques as those illustrated in FIG. 1.

The light source used in the coder section of the system shown in FIG. 2 is a diffused junction gallium-arsenide semiconductor diode. This electroluminescent source comprises a wafer 40 of "P-type" semiconductor material bonded to an "N-type" semiconductor wafer 41. The gallium-arsenide diode radiates light whenever the diode junction is subjected to forward electrical current flow. An example of this type of diode is the Philco GAE–402. Light may be obtained from such a device with high quantum efficiencies, particularly when the diode is cooled to liquid nitrogen temperatures (77° K.). The light results from a recombination process and is narrow band, being in the near-infrared region with wavelengths of approximately 0.9 micron. The currents and voltages used are consistent with more conventional semiconductor diodes and the light radiated has an intensity which is a very linear function of the forward current through the junction. A driving circuit of the type shown in FIG. 2 which comprises the series combination of a fixed bias source 42, a resistance 44 and a source of an input signal 45 may be employed. The source 45 may include a "sample and hold" circuit such that a pulse amplitude modulated signal is delivered to the diode junction.

The quantizing mask used in the circuit of FIG. 2 could, in one embodiment, consist of an opaque sheet 50 having different sized apertures which are positioned between the electroluminescent source and the light-sensitive threshold devices 51 through 54. To provide individual apertures having accurate areas for use with very small semiconductor devices, the holes may be burnt into the sheet 50 by means of the laser beam cutting technique now well known in the art. The quantizing mask sheet 50 may conveniently be made of a conductive material bonded directly to the wafer 40 in order to provide an electrical input surface for that wafer. Other types of quantizing masks may, of course, be employed; for example, tinted glass, variable exposed photographic film or attenuating mediums of different thicknesses.

The radiant energy from the junction of wafers 40 and 41 passes through the apertures in sheet 50 to a plurality of light-triggered threshold devices 51 through 54. Light-sensitive silicon diffused junction PNPN switches which exhibit a very high impedance in the OFF state and a very low impedance when triggered ON may be employed. These device are triggered ON whenever the level of the incident light is greater than a predetermined threshold. Two examples of such devices are the General Electric ZJ235 and the Solid State Products 'Photran." The latter, which includes a third control lead (terminal 56 on device 51) to permit adjustment of the light threshold level, is shown connected in the circuit of FIG. 2. The spectral response of this device peaks in the near-infrared region at about the same wavelength as the light emitted from the gallium-arsenide source.

The anodes of the PNPN devices 51 through 54 are connected through resistances 61 through 64, respectively, to a source of sampling pulses 65 while their cathodes are grounded. The control terminals of devices 51 through 54 are connected to a negative bias voltage source 70 through variable resistances 71 through 74, respectively. These variable resistances control the level of light intensity at which each of the PNPN devices is triggered ON.

Whenever a positive sampling pulse from source 65 is applied to the anodes of all of the PNPN devices 51 through 54 simultaneously, only those devices which receive an amount of light in excess of the preset threshold level will be triggered into a conductive state. Because they receive more light through the larger apertures, the lower devices will be triggered ON for intermediate input signal amplitudes while the upper PNPN devices will not be triggered. When the waveform from the sampling pulse source 65 goes negative once again, each of the PNPN devices 51 through 54 is reset to the nonconductive state.

A logic circuit 75 is included in the system shown in FIG. 2 to convert the redundant code group which appears at the anodes of the PNPN devices 71 through 74 into conventional binary form. The base of a transistor 81 is connected to the anode of device 51 and its emitter electrode is connected to the anode of device 52. Similarly, the base-emitter path of a transistor 82 is connected between the anodes of devices 52 and 53. The base-emitter path of a third transistor 83 connects the anodes of devices 53 and 54. The collector electrodes of these transistors are connected directly to the row conductors of a matrix having two column conductors 88 and 89. Crossconnecting resistors 91 and 92 connect the collector of transistor 81 to column conductors 88 and 89, respectively. A resistance 93 connects column conductor 89 to the collector of transistor 82 while a cross-connecting resistor 94 connects the collector of transistor 83 to column conductor 88. The logic circuit digit output terminals 96 and 97 are connected to the column conductors 88 and 89 by resistances 98 and 99, respectively. As will be shown, a positive operating potential is applied to the coder digit output terminals 96 and 97.

When the input signal level from source 45 is at its minimum value such that none of the PNPN devices 51 through 54 is triggered (at the time a positive sample pulse is delivered from source 65), both the base and emitter electrodes of all of the transistors will be positive. Hence, none of the transistors will be turned ON and no current flows in the column conductors 88 and 89. If, for example, only the lowermost PNPN device 54 receives sufficient light to be triggered into a conductive condition, a forward voltage appears across the base-emitter junction of transistor 83, turning it ON and allowing current to flow from terminal 97, through resistances 98 and 94 and the collector-emitter path of transistor 83 to the anode of PNPN device 54. As can be appreciated, only that transistor whose base-emitter path is connected between an ON and an OFF PNPN device is switched ON. This single conducting transistor energizes those column conductors which are to represent "1's" in the appropriate output binary code group.

The decoding scheme used in the transmission system of FIG. 2 is basically the same as that illustrated in FIG. 1. Gallium-arsenide diodes 101 and 102 may be employed as digit-operated sources in conjunction with a quantizing mask 103 of the type used in the coder section. The detector 104 preferably comprises a semiconductor photodiode made of silicon to provide high absorption of the 0.9 micron wavelengths emitted by the gallium-arsenide sources. Biased in the reverse direction by source 105, this form of detector provides an extremely linear light input v. electrical output characteristic. An example of this type of silicon photodiode is the Edgerton, Germeshausen and Grier (EGG) SD–100 photodiode.

The apertures in mask 103 are provided with an area of opening which is proportional to the significance of the associated digit. Using conventional binary digit weightings, therefore, each opening has half the area of the next larger opening.

Any diode which receives a "1" from the coder is energized. For example, if the PNPN devices 52, 53, and 54 in the coder are conductive while the PNPN device 51 is not, transistor 81 is turned ON to provide a current path from the operating source 106 through both diodes 101 and 102 and column conductors 88 and 89, respectively. Both diodes 101 and 102 being "lit," the photodiode 104 receives light through both of the apertures shown in mask 103 to allow a measured current to flow through load 108. This, in turn, causes a voltage to appear across load 108 which is an approximate replica of the original input voltage applied to the coder from the source 45. The circuit of FIG. 2 may be extended to any desired number of digits, in which case the uppermost transistor will have its emitter connected to the anode of the uppermost PNPN device and its base connected through a resistance to the sampling pulse source 65 only.

It is to be understood that the embodiment of the invention which has been described is merely an illustration of one application of the principles of the invention. Numerous modifications could be made by those skilled in the art without departing from the true spirit and scope of the invention.

What is claimed is:

1. A digital communication system having a transmitting end and a receiving end comprising in combination a source of an electrical analog signal, an electro-optical transducer connected to said source for converting said signal into light having an intensity relating to the amplitude of said analog signal, a plurality of light-triggered threshold devices each positioned to receive light from said transducer and each adapted for generating a threshold signal whenever the intensity of received light is greater than a predetermined level, means interposed between said transducer and each of said threshold devices for attenuating the intensity of light striking different ones of said devices by different amounts so that said threshold devices are activated at different levels of light intensity of said light source, means connected to said threshold devices and responsive to said threshold signals for generating a code signal having a plurality of bits with first and second signal levels indicative of the amplitude of said electrical analog signal, a transmission path for communicating said code signal from said transmitting end to said receiving end, a plurality of light sources at said receiving end, each activated and deactivated in response to selective ones of said bits when said signal of said bits is at said first and second levels respectively, detecting means position to receive light from each of said light sources and for converting the total received light into an electrical signal having a magnitude related to the intensity of the total received light, and means interposed between said detecting means and said light sources for attenuating the light from different ones of said light sources by different amounts, so that the total light received by said detecting means corresponds to the magnitude of said original electrical analog signal.

2. Apparatus for converting an analog modulated light signal into a digitally modulated light signal which comprises, in combination, a plurality of light-triggered threshold devices each positioned to receive said analog modulated light signal and each adapted for generating a threshold signal whenever the intensity of received light is greater than a predetermined level, means interposed in the path of said analog modulated light signal for attenuating the intensity of light striking different ones of said devices by differing amounts so that each of said threshold devices is activated at a different level of light intensity of said analog modulated light signal, means connected to said threshold devices and responsive to said plurality of threshold signals for generating a multibit code signal which is indicative of the instantaneous intensity of said analog modulated light signal, and a plurality of light sources each being activated and deactivated in response to selective ones of said bits in said code signal to form a digitally modulated light signal.

3. In combination, a source of an electrical analog signal, an electro-optical transducer connected to said source for converting said signal into light having an intensity related to the amplitude of said signal, a plurality of light-triggered threshold devices each positioned to receive said light and each adapted for generating a predetermined threshold signal whenever the intensity of received light is greater than a predetermined level, means interposed between said transducer and each of said threshold devices for attenuating the intensity of light striking different ones of said devices by different amounts, and means connected to said threshold devices and responsive to said threshold signals from said threshold devices for generating a code signal indicative of the amplitude of said electrical analog signal.

4. In combination, a source of a code word having $n$ bits, where each bit is represented by a signal having a first and a second level, $n-1$ light sources each being turned ON in response to selected ones of said bits when said signal is at said first level, and each being turned OFF in response to said bits when said signal is at said second level, detecting means positioned to receive light from each of said light sources and for converting the total received light into an electrical signal having a magnitude related to the intensity of the total received light, and means interposed between said detecting means and said light sources for attenuating the light from different ones of said sources by different amounts.

References Cited

UNITED STATES PATENTS

| | | | |
|---|---|---|---|
| 2,543,116 | 2/1951 | Llewellyn | 332—11 |
| 2,596,199 | 5/1952 | Bennett | 332—11 |
| 3,275,746 | 9/1966 | Beltrami. | |
| 3,328,583 | 6/1967 | Davison | 250—199 |
| 3,340,479 | 9/1967 | Ashkin. | |

OTHER REFERENCES

W. P. Dumke: IBM Technical Disclosure Bulletin, Light Coupled Threshold Logic, September 1963, vol. 6, No. 4, p. 142.

S. Saito: Electronics, The Versatile Point-Contact Diode, January 1963, vol. 36, No. 1, pp. 82–85.

ROBERT L. GRIFFIN, *Primary Examiner.*

A. J. MAYER, *Assistant Examiner.*